United States Patent Office 3,808,317
Patented Apr. 30, 1974

3,808,317
STABILIZED AQUEOUS BORATE COMPLEXES OF BIOLOGICALLY ACTIVE CATECHOL AMINES
Gerald Hecht, Fort Worth, and Neal H. Bigelow, New Braunsels, Tex., assignors to Alcon Laboratories, Inc., Fort Worth, Tex.
No Drawing. Continuation-in-part of abandoned application Ser. No. 872,352, Oct. 29, 1969. This application Mar. 1, 1972, Ser. No. 230,983
Int. Cl. A61k 27/00
U.S. Cl. 424—175
6 Claims

ABSTRACT OF THE DISCLOSURE

Stabilized aqueous borate complexes of biologically active catechol amines for the treatment of open-angle glaucoma including an antioxidant system comprising ascorbic acid and N-acetyl-1-cysteine.

---

This application is a continuation-in-part of application Ser. No. 872,352, filed Oct. 29, 1969, now abandoned.

This invention relates generally to stabilized aqueous solutions of biologically active catechol amines, and more particularly it relates to aqueous borate complex solutions of catechol amines which have good stability against harmful oxidation upon exposure to oxygen and light, i.e., to ambient surroundings.

The biologically active catechol amines are known medicinal agents in the treatment of respiratory disorders such as asthma and for the treatment of simple open-angle glaucoma. The most widely used of the biologically active catechol amines is epinephrine, and the present invention is principally described in connection with the stabilization of aqueous borate complexs of epinephrine against harmful oxidation due to exposure to oxygen and light. However, it is to be understood that the present invention is equally useful with other biologically active catechol amines, described hereinafter.

The use of epinephrine in the treatment of open-angle glaucoma requires that an aqueous epinephrine solution be instilled into the eye. Epinephrine is rapidly oxidized at room temperature by oxygen and light present in the ambient surroundings. It is known to stabilize an aqueous epinephrine solution against oxidation by adjusting its pH to below 3.5, but this pH may be unacceptable for opthalmic preparations due to irritation and discomfort of the eye caused by the acidic medium.

It is also known to stabilize an aqueous epinephrine solution by forming an epinephrine borate complex and adding to the solution an antioxidant system of sodium bisulfite and oxine sulfate. (U.S. Pat. No. 3,149,035.) This composition may be adjusted to a pH between 6.5 and 8.5, which is acceptable to the eye, and resists oxidation to a substantial degree. However, in the usual treatment of open-angle glaucoma with an epinephrine solution, the user places several drops of the solution in the eye each day. This causes repeated oxygenated and exposure to light of the epinephrine solution due to the repeated and frequent dosages required. In such instances it has been determined that the epinephrine solution stabilized with sodium bisulfite and oxine sulfate has a useful life of about 20 to 30 days, requiring frequent purchases of fresh solution. The onset of oxidation of an aqueous epinephrine solution is readily apparent due to the formation, upon oxidation, of adrenachrome, a colored, biologically inactive, oxidation product of epinephrine. The onset of color formation in the epinephrine solution signifies exhaustion of the antioxidant present in the composition.

It is a principal object of the invention to provide a stabilized aqueous borate complex of a biologically active catechol amine suitable for the treatment of open-angle glaucoma which has good stability and resistance to oxidation.

These and other objects of the invention may be readily understood from the following description.

Generally, the stabilized catechol amine composition described herein includes an aqueous solution of a catechol amine containing between about 0.03 and about 4 weight percent catechol amine, a sufficient amount of boric acid to complex with and solubilize the catechol amine, generally between about 0.05 and about 4.0 weight percent, and an antioxidant system which includes between about 0.05 and about 3 percent by weight of the solution of ascorbic acid and between about 0.05 and about 3 percent by weight of the solution of N-acetyl-1-cysteine.

The biologically active catechol amine may be any one of the well known catechol amines which possess a biological activity. Such compounds may be represented by the following formula.

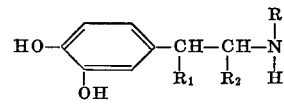

where $R_1$ is hydrogen, hydroxyl, or oxo, $R_2$ is hydrogen, methyl, or ethyl, $R_3$ is hydrogen, methyl, ethyl, isopropyl, or

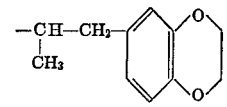

Metaproterenol has also been found to be effective in the treatment of glaucoma, and for the purposes of this application it is intended that the term "biologically active catechol amines" includes metaproterenol.

Examples of these catechol amines include adrenalone, ethylnorepinephrine, epinephrine, isoproterenol, norepinephrine, methylepinephrine, isoadrenaline, epinine, dopamine, protokylol, and metaproterenol. Generally, the preferred catechol amines are epinephrine, isoproterenol, and norepinephrine, and epinephrine is generally preferred among these.

The stabilized aqueous solution contains a sufficient amount of solubilized catechol amine to provide a medicinally useful composition. In the treatment of open-angle glaucoma, a desirable aqueous composition may contain between about 0.03 and about 4 weight percent epinephrine. Generally, compositions containing between about 0.5 and about 1.5 weight percent epinephrine have been found to be desirable. Of course, for particular purposes or for the preparation of bulk quantities of the solution the epinephrine may be persent in concentrations greater than about 4 weight percent, if this is desired.

The catechol amine composition contains a sufficient amount of boric acid to complex all of the epinephrine present in order to provide a solution of epinephrine borate complex. Generally, when the epinephrine concentration in the composition is between about 0.03 percent and about 4 percent, the boric acid may be present in amounts between about 0.05 and about 4.0 weight percent.

The catechol amine solution contains an antioxidant system which includes ascorbic acid and N-acetyl-1-cysteine. The utilization of a stabilizer system which includes ascorbic acid and N-acetyl-1-cysteine has been found to provide desirable stability and good resistance to oxidation. The oxidation resistance which is provided by the combination of ascorbic acid and N-acetyl-1-cysteine is considered to be longer lasting than the oxidation resistance provided by either of these compounds alone, and is also superior to the oxidation resistance of previously known epinephrine borate solutions.

The ascorbic acid and the N-acetyl-1-cysteine may each be present in an amount between 0.05 and about 3 weight percent. The ratio of ascorbic acid to N-acetyl-1-cysteine may be between about 1:10 and about 10:1, most preferably about 1:1.

The epinephrine borate solution may also contain a suitable microbiological preservative, for example, benzalkonium chloride or methyl and propyl paraben, and also a viscosity increasing agent, for example, hydroxypropyl methyl cellulose or polyvinyl alcohol may be utilized if desired. The use of such compounds, and other usual product adjuvants do not affect the stability of the catechol amine solution containing the described antioxidant system and the inclusion of these adjuvants to the composition is within the skill of the art.

The catechol amine composition may be adjusted to a relatively neutral pH, for example, between 5.5 and 8.5, preferably about 6.0, through the addition of a suitable basic compound such as sodium hydroxide or sodium carbonate, or such other buffering system as may be desired to provide a suitable pH.

The improved stability against oxidation of the described catechol amine compositions is achieved through the use of an antioxidant system which includes a combination of ascorbic acid and N-acetyl-1-cysteine. The improved stability is believed to result from the following explanation of what occurs during storage and use of an aqueous borate complex of a catechol amine, but the disclosed invention is not intended to be limited to such explanation.

The principal antioxidant in the system is the ascorbic acid which is a known antioxidant. Solutions containing ascorbic acid as the sole antioxidant are stable for reasonable lengths of time. However, when it is desired to store the solutions for extended periods of time, it has been found that the ascorbic acid has tendency to decompose through anaerobic and hydrolytic decomposition mechanisms, i.e., in the absence of oxygen, thus reducing the effective amount of antioxidant available for stabilization of the catechol amine when it is opened for use by the patient. If the ascorbic acid becomes depleted in this manner described during storage, e.g., in a warehouse, the catechol amine will undergo much more rapid oxidation during the repeated oxygenation of the solution which takes place during use of the solution in the treatment of open-angle glaucoma.

The addition of N-acetyl-1-cysteine to a catechol amine borate complex solution has been found to be desirable since it does not undergo anaerobic decomposition and therefore decomposes at a slower rate than does ascorbic acid. Thus, the N-acetyl-1-cysteine retains a greater portion of its antioxidant effect during storage than does the ascorbic acid. Further, the combination of ascorbic acid and N-acetyl-1-cysteine provides an improved stability in the presence of the buffers, viscosity increasing agents and the like, that are normally present in catechol amine solutions for treatment of open-angle glaucoma. The reason for this phenomenon is not fully understood.

The following are examples of catechol amine solutions in accordance with the disclosed invention.

EXAMPLE I

| | Percent by weight |
|---|---|
| Epinephrine, USP | 1.00 |
| Boric acid | 1.50 |
| Ascorbic acid | 0.50 |
| N-acetyl-1-cysteine | 0.50 |
| Sodium carbonate, q.s. pH 6.0. | |
| Purified water, q.s. | |

EXAMPLE II

| | Percent by weight |
|---|---|
| Norepinephrine | 1.00 |
| Boric acid | 1.50 |
| Ascorbic acid | 0.50 |
| N-acetyl-1-cysteine | 0.50 |
| Sodium carbonate, q.s. pH 6.0. | |
| Purified water, q.s. | |

EXAMPLE III

| | Percent by weight |
|---|---|
| Isoproterenol | 1.00 |
| Boric acid | 1.50 |
| Ascorbic acid | 0.50 |
| N-acetyl-1-cysteine | 0.50 |
| Sodium carbonate, q.s. pH 6.0. | |
| Purified water, q.s. | |

EXAMPLE IV

| | Percent by weight |
|---|---|
| Epinephrine, USP | 0.1 |
| Boric acid | 1.0 |
| Ascorbic acid | 0.5 |
| N-acetyl-1-cysteine | 0.5 |
| Sodium carbonate, q.s. pH 5.8. | |
| Purified water, q.s. | |

EXAMPLE V

| | Percent by weight |
|---|---|
| Epinephrine, USP | 0.25 |
| Boric acid | 1.0 |
| Ascorbic acid | 0.5 |
| N-acetyl-1-cysteine | 0.5 |
| Sodium carbonate, q.s. pH 5.8. | |
| Purified water, q.s. | |

EXAMPLE VI

| | Percent by weight |
|---|---|
| Epinehrine, USP | 0.25 |
| Boric acid | 0.6 |
| Ascorbic acid | 0.2 |
| N-acetyl-1-cysteine | 0.2 |
| Sodium carbonate, q.s. pH 6.0. | |
| Purified water, q.s. | |

EXAMPLE VII

| | Percent by weight |
|---|---|
| Epinephrine, USP | 0.5 |
| Boric acid | 1.2 |
| Ascorbic acid | 0.2 |
| N-acetyl-1-cysteine | 0.2 |
| Sodium carbonate, q.s. pH 6.0. | |
| Purified water, q.s. | |

EXAMPLE VIII

| | Percent by weight |
|---|---|
| Epinephrine, USP | 0.03 |
| Boric acid | 0.05 |
| Ascorbic acid | 0.05 |
| N-acetyl-1-cysteine | 0.05 |
| Sodium carbonate, q.s. pH 6.0. | |
| Purified water, q.s. | |

EXAMPLE IX

| | Percent by weight |
|---|---|
| Epinephrine, USP | 2.0 |
| Boric acid | 3.0 |
| Ascorbic acid | 1.0 |
| N-acetyl-1-cysteine | 1.0 |
| Sodium carbonate, q.s. pH 6.0. | |
| Purified water, q.s. | |

EXAMPLE X

| | Percent by weight |
|---|---|
| Isoproterenol | 1.0 |
| Boric acid | 1.5 |
| Ascorbic acid | 0.2 |
| N-acetyl-1-cysteine | 1.0 |
| Sodium carbonate, q.s. pH 6.0. | |
| Purified water, q.s. | |

EXAMPLE XI

| | Percent by weight |
|---|---|
| Isoproterenol | 1.0 |
| Boric acid | 1.5 |
| Ascorbic acid | 1.0 |
| N-acetyl-1-cysteine | 0.2 |
| Sodium carbonate, q.s. pH 6.0. | |
| Purified water, q.s. | |

The catechol amine compositions containing the described antioxidant system have been found to be stable for many months during storage and retain this stability after opening and during usage. Such compositions have been found to be safe in both human and animal controlled testing and to provide effective treatment of simple open-angle glaucoma.

Various features of the present invention are set forth in the following claims.

What is claimed is:

1. A stabilized aqueous biologically active catechol amine solution for treatment of open-angle glaucoma, comprising between about 0.03 and about 4 percent by weight catechol amine complexed with between about 0.05 and about 4 percent by weight boric acid to provide a water soluble catechol amine borate complex, said solution containing in admixture therewith between about 0.05 and about 3 percent by weight ascorbic acid and between about 0.05 and about 3 percent by weight N-acetyl-1-cysteine, the ratio of ascorbic acid to N-acetyl-1-cysteine being between about 1:10 and 10:1.

2. A stabilized aqueous catechol amine solution in accordance with claim 1 wherein the catechol amine is epinephrine, isoproterenol, or norepinephrine.

3. A stabilized aqueous catechol amine solution in accordance with claim 2 wherein the ratio of ascorbic acid to N-acetyl-1-cysteine is about 1:1.

4. A stabilized aqueous catechol amine solution in accordance with claim 2 having a pH between about 5.5 and about 8.5.

5. A stabilized aqueous catechol amine solution in accordance with claim 1, comprising about 0.125 percent by weight epinephrine complexed with about 1 percent by weight boric acid, about 0.5 percent by weight ascorbic acid, and about 0.5 percent by weight N-acetyl-1-cysteine, said solution having a pH of about 6.0.

6. A stabilized aqueous catechol amine solution in accordance with claim 1, comprising about 0.25 percent by weight epinephrine complexed with about 1 percent by weight boric acid, about 0.5 percent by weight ascorbic acid, and about 0.5 percent by weight N-acetyl-1-cysteine, said solution having a pH of about 6.0.

References Cited

UNITED STATES PATENTS

| | | | |
|---|---|---|---|
| 3,149,035 | 4/1961 | Riegelman | 424—175 |
| 2,047,144 | 7/1936 | Kharasch | 424—175 |
| 2,498,200 | 2/1950 | Bray | 424—175 |
| 2,735,799 | 2/1956 | Abramson | 424—175 |

OTHER REFERENCES

Chem. Abst. 51—4658f (1957).
Chem. Abst. 51—12325f (1957).

STANLEY J. FRIEDMAN, Primary Examiner

U.S. Cl. X.R.

424—185, 280, 319, 330

UNITED STATES PATENT OFFICE
CERTIFICATE OF CORRECTION

Patent No. 3,808,317            Dated April 30, 1974

Inventor(s) Gerald Hecht and Neal H. Bigelow

It is certified that error appears in the above-identified patent and that said Letters Patent are hereby corrected as shown below:

In the first formula appearing in Column 2 at line 23, the "R" at the upper righthand corner should be --$R_3$--

Signed and sealed this 1st day of October 1974.

(SEAL)
Attest:

McCOY M. GIBSON JR.            C. MARSHALL DANN
Attesting Officer               Commissioner of Patents